United States Patent
Kravets

(10) Patent No.: US 7,580,692 B2
(45) Date of Patent: Aug. 25, 2009

(54) MOBILE WIRELESS COMMUNICATIONS DEVICE HAVING LOW-IF RECEIVER CIRCUITRY THAT ADAPTS TO RADIO ENVIRONMENT

(75) Inventor: Oleksiy Kravets, Kitchener (CA)

(73) Assignee: Research in Motion Limited, Waterloo, Ontario (CA)

( * ) Notice: Subject to any disclaimer, the term of this patent is extended or adjusted under 35 U.S.C. 154(b) by 442 days.

(21) Appl. No.: 11/383,501

(22) Filed: May 16, 2006

(65) Prior Publication Data

US 2007/0270115 A1    Nov. 22, 2007

(51) Int. Cl.
H04B 1/10        (2006.01)
H04B 7/00        (2006.01)

(52) U.S. Cl. .............. 455/302; 455/278.1; 455/285; 455/296

(58) Field of Classification Search .......... 455/283, 455/296, 302, 315, 314, 339, 340, 207, 209, 455/278.1, 285
See application file for complete search history.

(56) References Cited

U.S. PATENT DOCUMENTS

| | | | | |
|---|---|---|---|---|
| 5,933,768 A | * | 8/1999 | Skold et al. ............... | 455/296 |
| 5,963,856 A | | 10/1999 | Kim .......................... | 455/307 |
| 6,226,509 B1 | * | 5/2001 | Mole et al. ................ | 455/302 |
| 6,373,909 B2 | * | 4/2002 | Lindquist et al. .......... | 375/346 |
| 6,707,858 B1 | * | 3/2004 | Davie ........................ | 375/316 |
| 6,876,842 B2 | * | 4/2005 | Davie ........................ | 455/302 |
| 6,892,060 B2 | | 5/2005 | Zheng ....................... | 455/302 |
| 6,954,628 B2 | | 10/2005 | Minnis et al. .............. | 455/324 |
| 6,993,314 B2 | | 1/2006 | Lim et al. .................. | 455/333 |
| 7,116,965 B2 | * | 10/2006 | Minnis et al. .............. | 455/323 |
| 2003/0060180 A1 | | 3/2003 | Hall et al. ................. | 455/302 |
| 2003/0109276 A1 | | 6/2003 | Wilson ...................... | 455/552 |
| 2005/0123072 A1 | * | 6/2005 | Guimaraes ................ | 375/319 |
| 2005/0164669 A1 | | 7/2005 | Molnar et al. ............. | 455/320 |
| 2006/0068739 A1 | | 3/2006 | Maeda et al. .............. | 455/295 |
| 2006/0160518 A1 | * | 7/2006 | Seendripu et al. ......... | 455/323 |
| 2007/0165748 A1 | * | 7/2007 | Khlat et al. ............... | 375/322 |

FOREIGN PATENT DOCUMENTS

| | | |
|---|---|---|
| EP | 1551099 | 7/2005 |
| WO | 98/43364 | 10/1998 |
| WO | 00/11795 | 3/2000 |

* cited by examiner

*Primary Examiner*—Sonny Trinh
(74) *Attorney, Agent, or Firm*—Yee & Associates, P.C.

(57) ABSTRACT

A mobile wireless communications device, system and associated method includes a housing and circuit board that includes radio frequency (RF) circuitry and processor operative with each other. The RF circuitry includes a low-IF receiver circuit that is operative for maintaining an interferer signal at a same frequency side as a wanted signal relative to a local oscillator frequency setting, creating an interferer image signal, and filtering the image signal as substantially baseband frequency.

20 Claims, 6 Drawing Sheets

US 7,580,692 B2

MOBILE WIRELESS COMMUNICATIONS DEVICE HAVING LOW-IF RECEIVER CIRCUITRY THAT ADAPTS TO RADIO ENVIRONMENT

FIELD OF THE INVENTION

The present invention relates to the field of communications devices, and more particularly, to mobile wireless communications devices and related systems and methods that use low IF receiver circuitry that adapts to the radio environment.

BACKGROUND OF THE INVENTION

Cellular communication systems continue to grow in popularity and have become an integral part of both personal and business communications. Cellular telephones and similar devices allow users to place and receive phone calls most anywhere they travel. Moreover, as cellular telephone technology is increased, so too has the functionality of cellular devices. For example, many cellular devices now incorporate Personal Digital Assistant (PDA) features such as calendars, address books, task lists, calculators, memo and writing programs, etc. These multi-function devices usually allow users to send and receive electronic mail (email) messages wirelessly and access the internet via a cellular network and/or a wireless local area network (WLAN), for example.

Many of the cellular communications use packet burst transmissions as part of a Global System for Mobile communications (GSM) system, which includes the 450 MHz, 900 MHz, 1800 MHz and 1900 MHz frequency bands. The current generation of wireless transceivers typically use two main types of receiver architectures, i.e., a direct conversion receiver architecture or a digital low-IF receiver architecture (also termed very low-IF, i.e., VLIF), thus, eliminating much of the prior generation analog down conversion stage. Much of the expensive and bulky intermediate frequency (IF) components used in conventional superheterodyne receivers has been eliminated with direct conversion and low-IF receiver architecture. In a direct conversion receiver, a signal is converted directly to baseband, while in a digital low-IF receiver, some advantages of the superheterodyne remain with the economic and integrated advantages of a direct conversion receiver.

In a low-IF receiver, on the other hand, the RF signal can be mixed down to a non-zero low or moderate intermediate frequency, typically a few megahertz in some examples. Thus, the low-IF receiver architecture includes many of the desirable properties of the zero-IF receiver architectures, yet still avoids DC offset and some 1/F-noise problems. The non-zero IF receiver architecture will reintroduce some signal image issues. In a low-IF receiver, the RF signal is band selected and downconverted to the frequency close to baseband, sometimes as close as 100 KHz. This low-IF signal can be filtered with a low pass filter and amplifier before its conversion to the digital domain by an analog-to-digital converter (ADC). Any final signal downconversion for baseband and fine gain control can be performed digitally in a processor.

It is also possible to incorporate some high-resolution, oversampling and delta-sigma converters to permit channel filtering, including the use of digital signal processing (DSP) techniques rather than analog filters. The signal could interface to a digital processor or a digital-to-analog converter and output analog Inphase (I) and Quadrature (Q) signals to the processor.

An important GSM receiver parameter is the rejection of interferer signals to enhance performance of the low-IF receiver. European Telecommunications Standards Institute (ESTI) mobile station conformance specifies very strict certification tests (14.5, 14.18.3) that are not easy to pass using GSM receivers currently available on the market. Even if a receiver passes certification tests, having better performance resulting from interferer signal rejection may significantly improve end-user experience in large urban areas, where strong radio interference is a common problem.

Rejection of interferer signals is usually a problem for very low-IF receiver architecture where rejection performance is limited by I/Q gain and phase imbalance. The common way to address this problem is to use I/Q imbalance calibration where I/Q gain and phase will be adjusted during digital baseband processing based on previously calculated calibration tables. Unfortunately, these types of calibration processes do not provide enough accuracy when time measurements during calibration cycle are limited. If the calibration time is extended, however, the manufacturing costs for a single communications device may increase significantly.

Some proposals to solve such problems toggle the local oscillator (LO) with a "round-robin" scheme using a low-side LO injection during one receive (RX) session and a high-side LO injection in another session. This solution does not use any feedback from the radio environment, thus achieving only a basic "averaging" of the interferer image. There is typically no knowledge of the external environment. Also, by not taking the type of signal used in the receive session into account, results in a worst case scenario when, for example, distorted signal bursts are mixed with Received Signal Strength Indication (RSSI) measurements, and the resulting data stream picks the worst interferer appearance.

BRIEF DESCRIPTION OF THE DRAWINGS

Other objects, features and advantages will become apparent from the detailed description which follows when considered in light of the accompanying drawings in which.

DETAILED DESCRIPTION OF THE PREFERRED EMBODIMENTS

Figure 1:
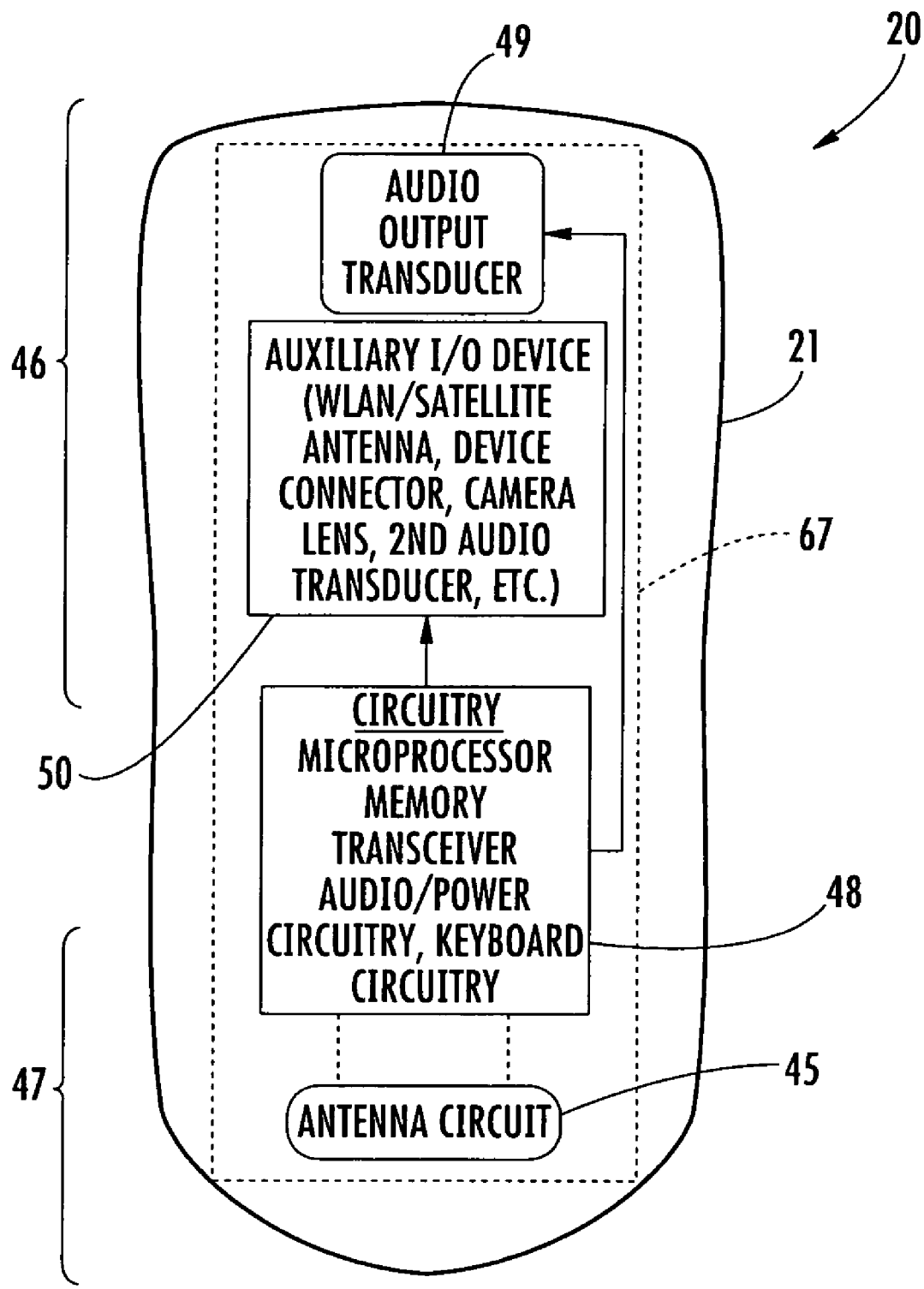
FIG. 1 is a schematic block diagram of an example of a mobile wireless communications device configured as a handheld device that can be used in accordance with non-limiting examples and illustrating basic internal components thereof.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

In accordance with non-limiting examples, a mobile wireless communications device includes a housing and circuit board carried by the housing. The circuit board includes a radio frequency (RF) circuit and processor operative with each other. The RF circuitry includes a low-IF receiver circuit that is operative for maintaining an interferer signal at the same frequency as a wanted signal relative to a local oscillator frequency setting, creating an interferer image signal, and filtering the image signal at substantially baseband frequency.

A radio frequency (RF) circuit can include a Digital Signal Processing (DSP) circuit that is operative for filtering the interferer image signal. The RF circuitry can be operative for placing an interferer signal in the substantially baseband frequency where a highest out-of-band signal attenuation is implemented.

In yet another aspect, the RF circuitry can include at least one mixer circuit and a local oscillator circuit. A demodulator circuit that could comprise an analog-to-digital converter, digital mixer and processor is operative for demodulating signals. The RF circuitry is operative for determining between the better performing local oscillator frequency setting and a poorer performing local oscillator frequency setting based on signal-to-noise values obtained during demodulation. The RF circuitry can also be operative for using different low-IF local oscillator frequency settings for an RF channel based on the signal-to-noise values.

The communications signals can be formed as data bursts in accordance with the global system for mobile communications. The RF circuitry can also be operative for returning to a poorer performing local oscillator frequency setting from a better performing local oscillator frequency setting after a predetermined number of received data bursts to determine if the local oscillator frequency setting should be changed to adapt to a changed radio environment.

A method aspect and radio receiver are also set forth.

In accordance with one non-limiting example, the limitations caused by, for example, calibration time being extended can be overcome by adjusting the radio frequency (RF) circuit configuration at "run time" based on the current radio environment "quality." Thus, an issue that is addressed is the strong, narrow-band (unmodulated) interferer rejection, which is addressed by placing the interferer in the baseband frequency where the highest out-of-band signal attenuation is implemented. Since most of the very low-IF receivers have non-symmetrical frequency response, this could aid in preventing signal waveform clipping in baseband analog/digital converters.

The system and method can be based on radio channel feedback statistics, for example, the statistics of the signal-to-noise (SNR) ratio from the demodulation of the GSM bursts that are collected during regular receiver operation. SNR statistics can be collected for all used GSM channels. Different low-IF local oscillator (LO) frequencies or frequency settings can be used for the same channel. As soon as a strong interferer appears either in the lower or the higher frequency, the SNR from the GSM burst demodulation will identify which LO frequency setting has a worst or poorer performing performance compared to other LO settings. The proposed algorithm creates a map of all used radio channels and will try to adjust the local oscillator frequency setting "on-the-fly" to receive the signals using the "best guess," i.e., better performing LO configuration. The system and method can use an algorithm that could return to the worst or poorer performing case LO frequency configuration after a predefined amount of received sessions to check for any radio environment "improvements." As a result, the system and method can maintain the interferer at the same frequency side as the wanted signal relative to the LO frequency setting, thus creating an interferer "image" out of the wanted signal band, and filtered out in the baseband Digital Signal Processing (DSP) circuit.

Figure 2:
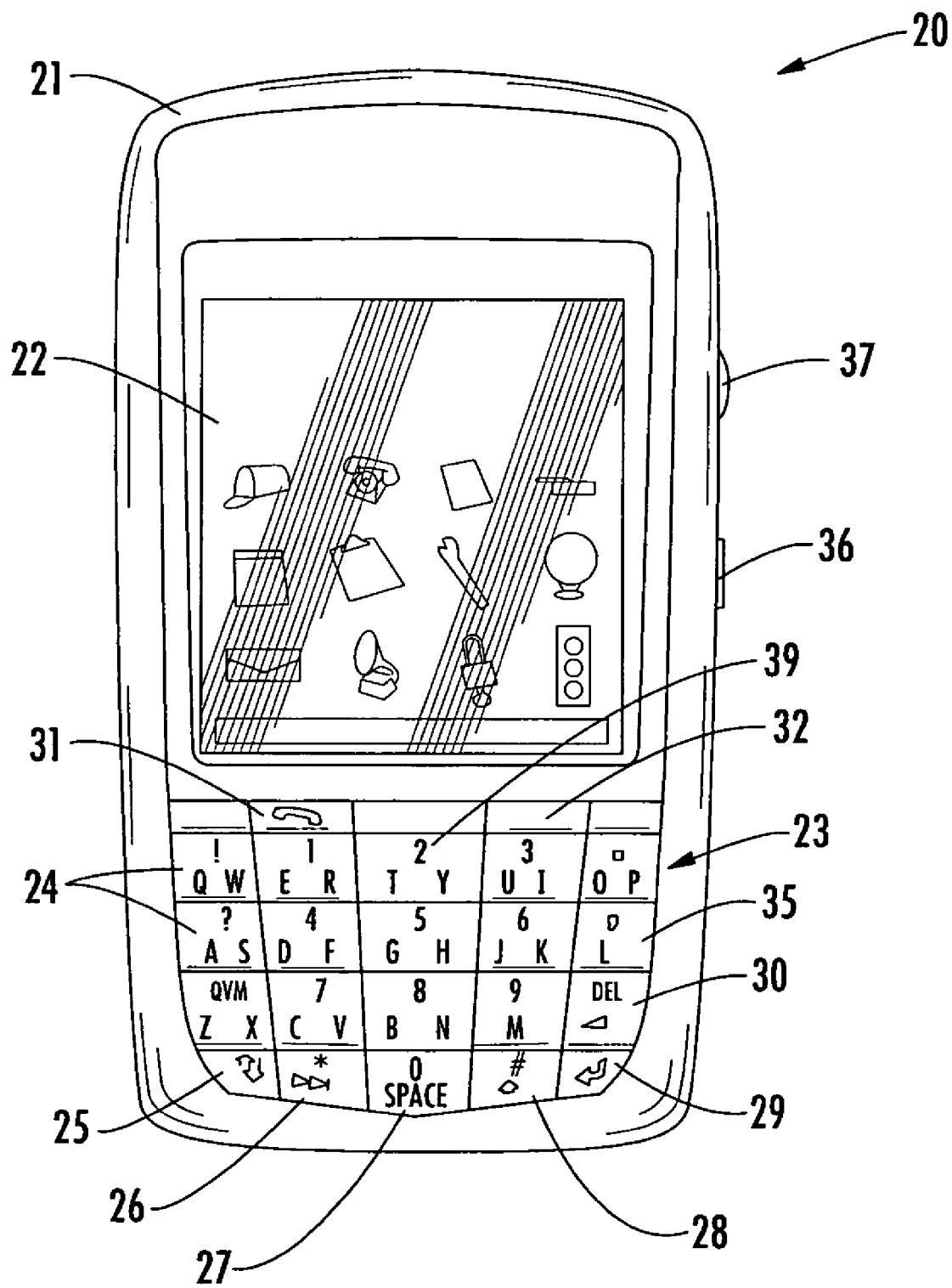
FIG. 2 is a front elevation view of the mobile wireless communications device of FIG. 1.
Figure 3:
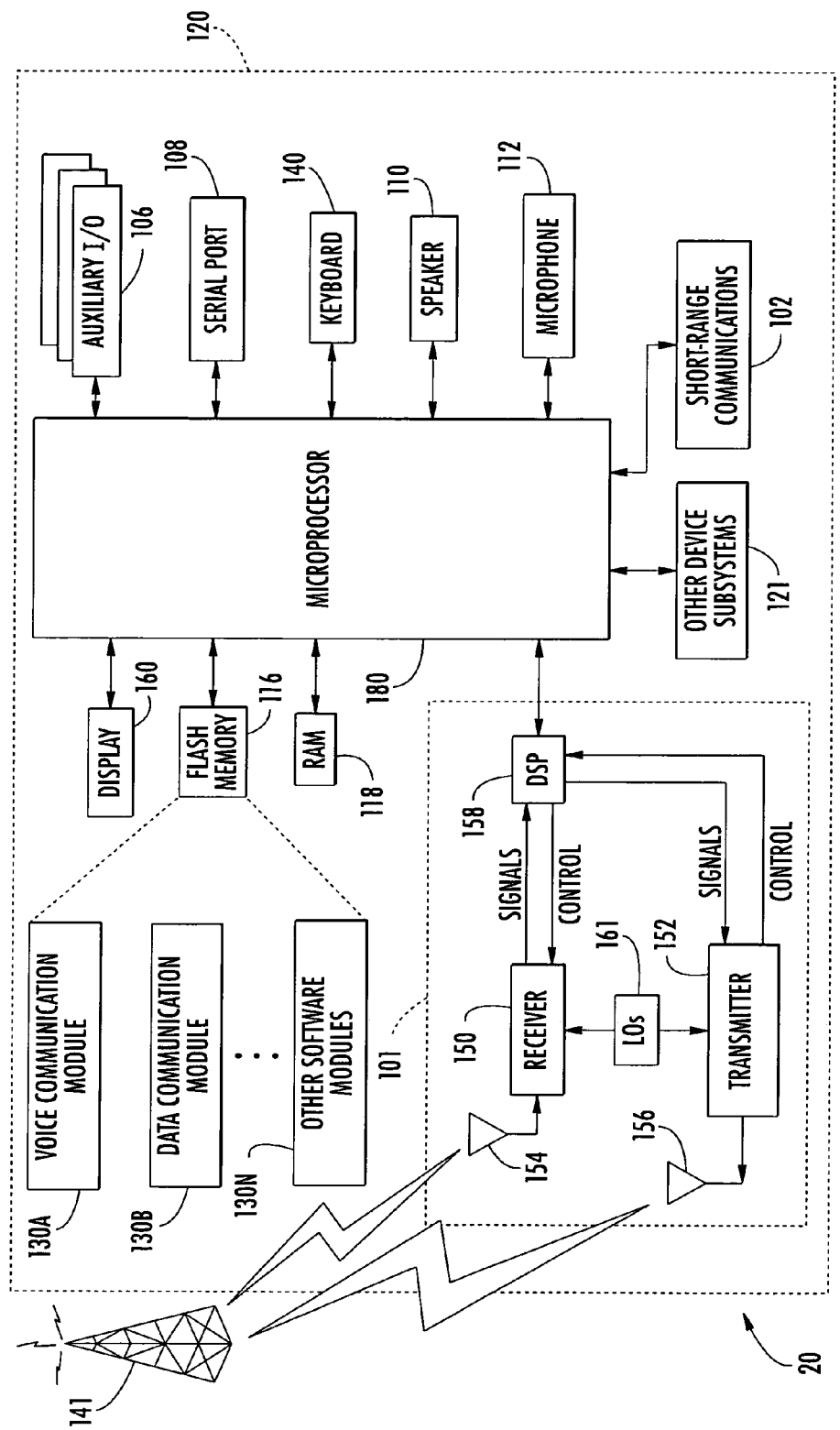
FIG. 3 is a schematic block diagram showing basic functional circuit components that can be used in the mobile wireless communications device of FIGS. 1-2.

A brief description will now proceed relative to FIGS. 1-3, which disclose an example of a mobile wireless communications device, for example, a handheld portable cellular radio, which can incorporate non-limiting examples of various circuits that can be used with the low-IF receiver circuitry that adapts to the environment as will be described below. FIGS. 1-3 are representative non-limiting examples of the many different types of functional circuit components and their interconnection, and operative for use with low-IF receiver circuitry.

Referring initially to FIGS. 1 and 2, an example of a mobile wireless communications device 20, such as a handheld portable cellular radio is first described. This device 20 illustratively includes a housing 21 having an upper portion 46 and a lower portion 47, and a dielectric substrate (i.e., circuit board) 67, such as a conventional printed circuit board (PCB) substrate, for example, carried by the housing. A housing cover (not shown in detail) would typically cover the front portion of the housing. The term circuit board 67 as used hereinafter can refer to any dielectric substrate, PCB, ceramic substrate or other circuit carrying structure for carrying signal circuits and electronic components within the mobile wireless communications device 20. The illustrated housing 21 is a static housing, for example, as opposed to a flip or sliding housing which are used in many cellular telephones. However, these and other housing configurations may also be used.

Circuitry 48 is carried by the circuit board 67, such as a microprocessor, memory, one or more wireless transceivers (e.g., cellular, WLAN, etc.), which includes RF circuitry, including audio and power circuitry, including any keyboard circuitry. It should be understood that keyboard circuitry could be on a separate keyboard, etc., as will be appreciated by those skilled in the art. A battery (not shown) is also preferably carried by the housing 21 for supplying power to the circuitry 48. The term RF circuitry could encompass the interoperable RF transceiver circuitry, power circuitry and audio circuitry.

Furthermore, an audio output transducer 49 (e.g., a speaker) is carried by an upper portion 46 of the housing 21 and connected to the circuitry 48. One or more user input interface devices, such as a keypad (keyboard) 23 (FIG. 2), is also preferably carried by the housing 21 and connected to the circuitry 48. The term keypad as used herein also refers to the term keyboard, indicating the user input devices having lettered and/or numbered keys commonly known and other embodiments, including multi-top or predictive entry modes. Other examples of user input interface devices include a scroll wheel 37 and a back button 36. Of course, it will be appreciated that other user input interface devices (e.g., a stylus or touch screen interface) may be used in other embodiments.

An antenna 45 is preferably positioned at the lower portion 47 in the housing and can be formed as a pattern of conductive traces that make an antenna circuit, which physically forms the antenna. It is connected to the circuitry 48 on the main circuit board 67. In one non-limiting example, the antenna could be formed on an antenna circuit board section that extends from the main circuit board at the lower portion of the housing. By placing the antenna 45 adjacent the lower portion 47 of the housing 21, the distance is advantageously increased between the antenna and the user's head when the phone is in use to aid in complying with applicable SAR requirements. Also, a separate keyboard circuit board could be used.

More particularly, a user will typically hold the upper portion of the housing 21 very close to his head so that the audio output transducer 49 is directly next to his ear. Yet, the lower portion 47 of the housing 21 where an audio input transducer (i.e., microphone) is located need not be placed directly next to a user's mouth, and can be held away from the user's mouth. That is, holding the audio input transducer close to the user's mouth may not only be uncomfortable for the user, but it may also distort the user's voice in some circumstances. In addition, the placement of the antenna 45 adjacent the lower portion 47 of the housing 21 also advantageously spaces the antenna farther away from the user's brain.

Another important benefit of placing the antenna 45 adjacent the lower portion 47 of the housing 21 is that this may allow for less impact on antenna performance due to blockage by a user's hand. That is, users typically hold cellular phones toward the middle to upper portion of the phone housing, and are therefore more likely to put their hands over such an antenna than they are an antenna mounted adjacent the lower portion 47 of the housing 21. Accordingly, more reliable performance may be achieved from placing the antenna 45 adjacent the lower portion 47 of the housing 21.

Still another benefit of this configuration is that it provides more room for one or more auxiliary input/output (I/O) devices 50 to be carried at the upper portion 46 of the housing. Furthermore, by separating the antenna 45 from the auxiliary I/O device(s) 50, this may allow for reduced interference therebetween.

Some examples of auxiliary I/O devices 50 include a WLAN (e.g., Bluetooth, IEEE 802.11) antenna for providing WLAN communication capabilities, and/or a satellite positioning system (e.g., GPS, Galileo, etc.) antenna for providing position location capabilities, as will be appreciated by those skilled in the art. Other examples of auxiliary I/O devices 50 include a second audio output transducer (e.g., a speaker for speaker phone operation), and a camera lens for providing digital camera capabilities, an electrical device connector (e.g., USB, headphone, secure digital (SD) or memory card, etc.).

It should be noted that the term "input/output" as used herein for the auxiliary I/O device(s) 50 means that such devices may have input and/or output capabilities, and they need not provide both in all embodiments. That is, devices such as camera lenses may only receive an optical input, for example, while a headphone jack may only provide an audio output.

The device 20 further illustratively includes a display 22, for example, a liquid crystal display (LCD) carried by the housing 21 and connected to the circuitry 48. A back button 36 and scroll wheel 37 can also be connected to the circuitry 48 for allowing a user to navigate menus, text, etc., as will be appreciated by those skilled in the art. The scroll wheel 37 may also be referred to as a "thumb wheel" or a "track wheel" in some instances. The keypad 23 illustratively includes a plurality of multi-symbol keys 24 each having indicia of a plurality of respective symbols thereon. The keypad 23 also illustratively includes an alternate function key 25, a next key 26, a space key 27, a shift key 28, a return (or enter) key 29, and a backspace/delete key 30.

The next key 26 is also used to enter a "*" symbol upon first pressing or actuating the alternate function key 25. Similarly, the space key 27, shift key 28 and backspace key 30 are used to enter a "0" and "#", respectively, upon first actuating the alternate function key 25. The keypad 23 further illustratively includes a send key 31, an end key 32, and a convenience (i.e., menu) key 39 for use in placing cellular telephone calls, as will be appreciated by those skilled in the art.

Moreover, the symbols on each key 24 are arranged in top and bottom rows. The symbols in the bottom rows are entered when a user presses a key 24 without first pressing the alternate function key 25, while the top row symbols are entered by first pressing the alternate function key. As seen in FIG. 2, the multi-symbol keys 24 are arranged in the first three rows on the keypad 23 below the send and end keys 31, 32. Furthermore, the letter symbols on each of the keys 24 are arranged to define a QWERTY layout. That is, the letters on the keypad 23 are presented in a three-row format, with the letters of each row being in the same order and relative position as in a standard QWERTY keypad.

Each row of keys (including the fourth row of function keys 25-29) is arranged in five columns. The multi-symbol keys 24 in the second, third, and fourth columns of the first, second, and third rows have numeric indicia thereon (i.e., 1 through 9) accessible by first actuating the alternate function key 25. Coupled with the next, space, and shift keys 26, 27, 28, which respectively enter a "*", "0", and "#" upon first actuating the alternate function key 25, as noted above, this set of keys defines a standard telephone keypad layout, as would be found on a traditional touch-tone telephone, as will be appreciated by those skilled in the art.

Accordingly, the mobile wireless communications device 20 as described may advantageously be used not only as a traditional cellular phone, but it may also be conveniently used for sending and/or receiving data over a cellular or other network, such as Internet and email data, for example. Of course, other keypad configurations may also be used in other embodiments. Multi-tap or predictive entry modes may be used for typing e-mails, etc. as will be appreciated by those skilled in the art.

The antenna 45 is preferably formed as a multi-frequency band antenna, which provides enhanced transmission and reception characteristics over multiple operating frequencies. More particularly, the antenna 45 is designed to provide high gain, desired impedance matching, and meet applicable SAR requirements over a relatively wide bandwidth and multiple cellular frequency bands. By way of example, the antenna 45 preferably operates over five bands, namely a 850 MHz Global System for Mobile Communications (GSM) band, a 900 MHz GSM band, a DCS band, a PCS band, and a WCDMA band (i.e., up to about 2100 MHz), although it may be used for other bands/frequencies as well. To conserve space, the antenna 45 may advantageously be implemented in three dimensions although it may be implemented in two-dimensional or planar embodiments as well.

The mobile wireless communications device shown in FIGS. 1 and 2 can incorporate e-mail and messaging accounts and provide different functions such as composing e-mail, PIN messages, and SMS messages. The device can manage messages through an appropriate menu that can be retrieved by choosing a messages icon. An address book function could add contacts, allow management of an address book, set address book options and manage SIM card phone books. A phone menu could allow for the making and answering of phone calls using different phone features, managing phone call logs, setting phone options, and viewing phone information. A browser application could permit the browsing of web pages, configuring a browser, adding bookmarks, and changing browser options. Other applications could include a task, memo pad, calculator, alarm and games, as well as handheld options with various references.

A calendar icon can be chosen for entering a calendar program that can be used for establishing and managing events such as meetings or appointments. The calendar program could be any type of messaging or appointment/meeting program that allows an organizer to establish an event, for example, an appointment or meeting.

A non-limiting example of various functional components that can be used in the exemplary mobile wireless communications device 20 of FIGS. 1 and 2 is further described in the example below with reference to FIG. 3. The device 20 illustratively includes a housing 120, a keypad 140 and an output device 160. The output device 160 shown is preferably a display, which is preferably a full graphic LCD. Other types of output devices may alternatively be used. A processing device 180 is contained within the housing 120 and is coupled between the keypad 140 and the display 160. The processing device 180 controls the operation of the display 160, as well as the overall operation of the mobile device 20, in response to actuation of keys on the keypad 140 by the user.

The housing 120 may be elongated vertically, or may take on other sizes and shapes (including clamshell housing structures). The keypad may include a mode selection key, or other hardware or software for switching between text entry and telephony entry.

In addition to the processing device 180, other parts of the mobile device 20 are shown schematically in FIG. 3. These include a communications subsystem 101; a short-range communications subsystem 102; the keypad 140 and the display 160, along with other input/output devices 106, 108, 110 and 112; as well as memory devices 116, 118 and various other device subsystems 121. The mobile device 20 is preferably a two-way RF communications device having voice and data communications capabilities. In addition, the mobile device 20 preferably has the capability to communicate with other computer systems via the Internet.

Operating system software executed by the processing device 180 is preferably stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the random access memory (RAM) 118. Communications signals received by the mobile device may also be stored in the RAM 118.

The processing device 180, in addition to its operating system functions, enables execution of software applications 130A-130N on the device 20. A predetermined set of applications that control basic device operations, such as data and voice communications 130A and 130B, may be installed on the device 20 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 141. Preferably, the PIM data items are seamlessly integrated, synchronized and updated via the wireless network 141 with the device user's corresponding data items stored or associated with a host computer system.

Communication functions, including data and voice communications, are performed through the communications subsystem 101, and possibly through the short-range communications subsystem. The communications subsystem 101 includes a receiver 150, a transmitter 152, and one or more antennae 154 and 156. In addition, the communications subsystem 101 also includes a processing module, such as a digital signal processor (DSP) 158, and local oscillators (LOs) 161. The specific design and implementation of the communications subsystem 101 is dependent upon the communications network in which the mobile device 20 is intended to operate. For example, the mobile device 20 may include a communications subsystem 101 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 20.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 20 may send and receive communications signals over the communication network 141. Signals received from the communications network 141 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communications functions, such as demodulation and decoding. In a similar manner, signals to be transmitted to the network 141 are processed (e.g.r modulated and encoded) by the DSP 158 and are then provided to the transmitter 152 for digital to analog conversion, frequency up conversion, filtering, amplification and transmission to the communication network 141 (or networks) via the antenna 156.

In addition to processing communications signals, the DSP 158 provides for control of the receiver 150 and the transmitter 152. For example, gains applied to communications signals in the receiver 150 and transmitter 152 may be adaptively controlled through automatic gain control algorithms implemented in the DSP 158.

In a data communications mode, a received signal. such as a text message or web page download, is processed by the communications subsystem 101 and is input to the processing device 180. The received signal is then further processed by the processing device 180 for an output to the display 160, or alternatively to some other auxiliary I/O device 106. A device user may also compose data items, such as e-mail messages, using the keypad 140 and/or some other auxiliary I/O device 106, such as a touchpad, a rocker switch, a thumb-wheel, or some other type of input device. The composed data items may then be transmitted over the communications network 141 via the communications subsystem 101.

In a voice communications mode, overall operation of the device is substantially similar to the data communications mode, except that received signals are output to a speaker 110, and signals for transmission are generated by a microphone 112. Alternative voice or audio I/O subsystems, such as a voice message recording subsystem, may also be implemented on the device 20. In addition, the display 160 may also be utilized in voice communications mode, for example to display the identity of a calling party, the duration of a voice call, or other voice call related information.

Any short-range communications subsystem enables communication between the mobile device 20 and other proximate systems or devices, which need not necessarily be similar devices. For example, the short-range communications subsystem may include an infrared device and associated circuits and components, or a Bluetooth™ communications module to provide for communication with similarly-enabled systems and devices.

It should be understood that GSM is a preferred communications system and uses a radio interface that can have an uplink frequency band and downlink frequency band with about 25 MHz bandwidth, typically subdivided into 124 carrier frequency channels, each spaced about 200 KHz apart as non-limiting examples. Time division multiplexing can be used to allow about 8 speech channels per radio frequency channel, giving 8 radio time slots and 8 burst periods grouped into what is called a TDMA frame. For example, a channel data rate could be about 270.833 Kbps and a frame duration of about 4.615 milliseconds (MS) in one non-limiting example. The power output can vary from about 1 to about 2 watts.

Typically, linear predictive coding (LPC) can be used to reduce the bit rate and provide parameters for a filter to mimic a vocal track with speech encoded at about 13 Kbps. Four different cell sizes can be used in a GSM network, including macro, micro, pico and umbrella cells. A base station antenna can be installed on a master building above the average rooftop level in a macrocell. In a microcell, the antenna height can be under the average rooftop level and used in urban areas. Microcells typically have a diameter of about a few dozen meters and are used indoors. Umbrella cells can cover shadowed regions or smaller cells. Typically, the longest distance for the GSM specification covered by an antenna is about 22 miles depending on antenna height, gain and propagation conditions.

GSM systems typically include a base station subsystem, a network and switching subsystem, and a General Packet Radio Service (GPRS) core network. A subscriber identify module (SIM) is usually implemented in the communications device, for example, the well known SIM card, similar to a smart card containing the subscription information and phone book of a user. The user can also switch handsets or could change operators by changing a SIM.

The GSM signaling protocol has three general layers. Layer 1 is a physical layer using channel structures above the air interface. Layer 2 is the data link layer. Layer 3 is a signaling protocol, which includes three sublayers. These include a Radio Resources Management sublayer to control the setup, maintenance and termination of radio and fixed channels, including handovers. A Mobility Management sublayer manages the location updating and registration procedures and secures the authentication. A Connection Management sublayer handles general call control and manages supplementary services and the short message service. Signaling between different entities such as the Home Location Register (HLR) and Visiting Location Register (VLR) can be accomplished through a Mobile Application Part (MAP) built upon the Transaction Capabilities Application Part (TCAP) of the top layer of the Signaling System No. 7.

A Radio Resources Management (RRM) sublayer can oversee the radio and fixed link establishment between the mobile station and an MSE.

It is also possible to used Enhanced Data Rates for GSM Evolution (EDGE), as an enhancement to General Packet Radio Service (GPRS) networks. EDGE can use 8 Phase Shift Keying (8 PSK) and Gaussian Minimum Shift Keying (GMSK) for different modulation and coding schemes. A three-bit word can be produced for every changing carrier phase. A rate adaptation algorithm can adapt the Modulation and Coding Scheme (MCS) according to the quality of the radio channel and the bit rate and robustness of data transmission. Base stations are typically modified for EDGE use.

Figure 4:
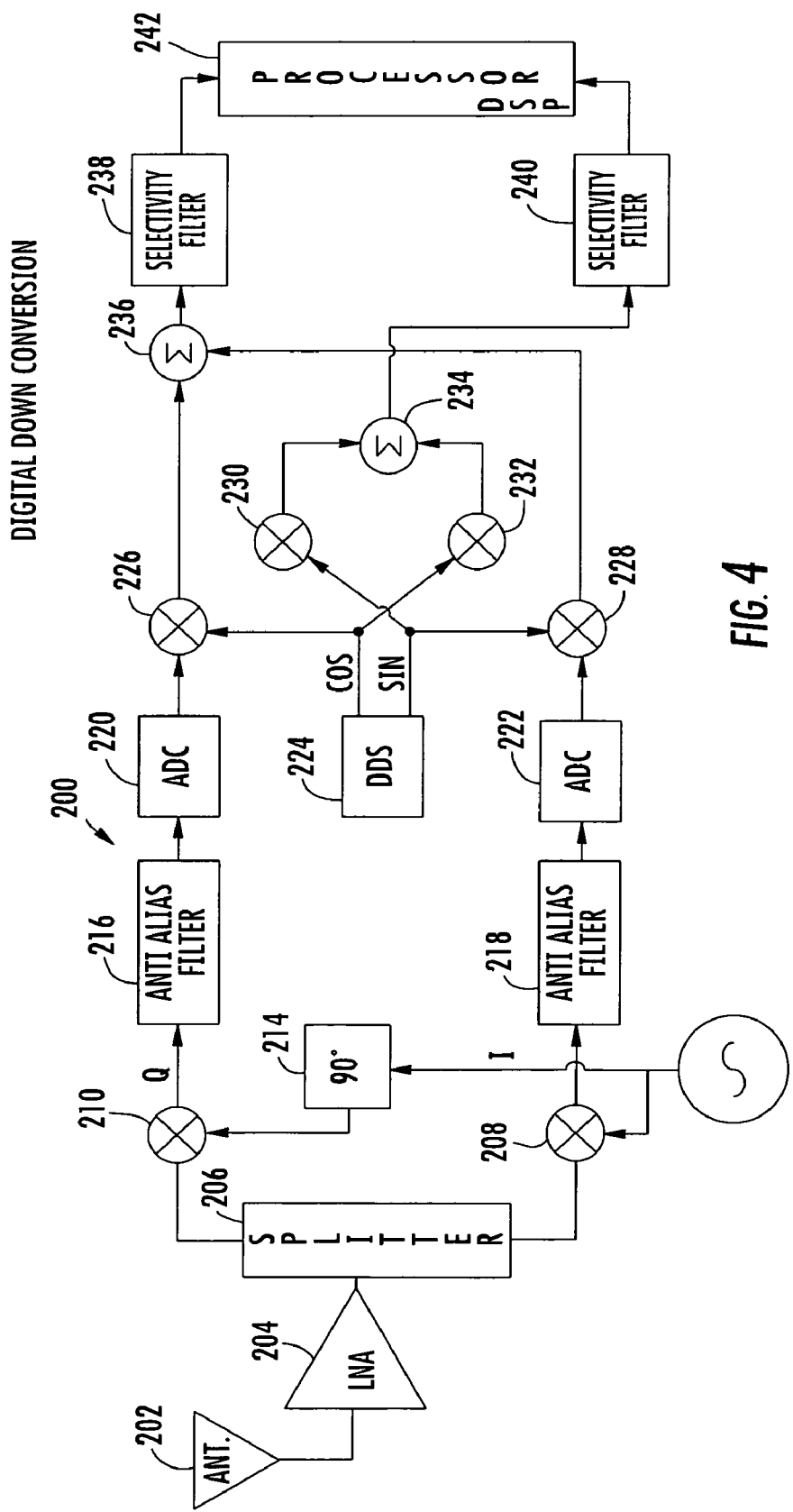
FIG. 4 is a high-level, schematic circuit and block diagram of a low-IF receiver that can use the system and method for adapting to the environment in accordance with non-limiting examples.

FIG. 4 is an example of a high-level block diagram and schematic circuit for a low-IF receiver that can be used with the system and method as described. The receiver 200 includes an antenna 202 that receives a communications signal and passes the signal to a low noise amplifier (LNA) 204. The signal is split within a splitter 206 and passes into mixers 208, 210. A signal generator 212 generates a local oscillator (LO) signal to the mixers 208, 210. One of the local oscillator signals is phase changed by a non-ideal hybrid source or shifter 214, creating phase imbalance at broadband. Respective signals are passed from respective mixers 208, 210 as illustrated. Each signal passes into respective anti-alias filters 216, 218 and then into respective analog/digital converters 220, 222. Digital mixing and demodulation occurs next. Each signal after conversion passes into a digital mixer circuit that includes multipliers 226, 228, with each also receiving a signal from a Direct Digital Synthesizer 224 as sine and cosine signals as illustrated. The signals from the Direct Digital Synthesizer 224 are multiplied in multipliers 230, 232 and summed within summer 234 as part of digital mixing. Signals from mixers 226, 228 are summed at summer 236. The signals from the summers 234, 236 are respectively filtered by selectivity filters 238, 240 and then processed within processor 242. The anti-alias filters can be non-ideal analog filters as a source of amplitude and phase imbalance at baseband.

In operation, after mixing in mixers 208, 210, the downconversion process begins. The mixer imbalance can create image problems as noted before. For example, negative frequencies can be translated to positive frequencies with significant attenuation. The Direct Digital Synthesizer with the multiplers can allow the shifting down to zero.

Figure 5:
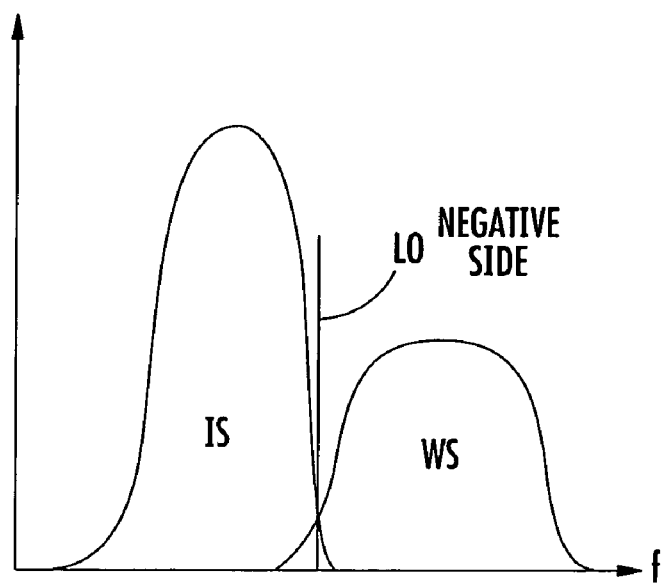
FIG. 5 is a graph showing an interferer signal, a wanted signal and a local oscillator (signal) having a negative frequency offset from the desired central frequency.
Figure 6:
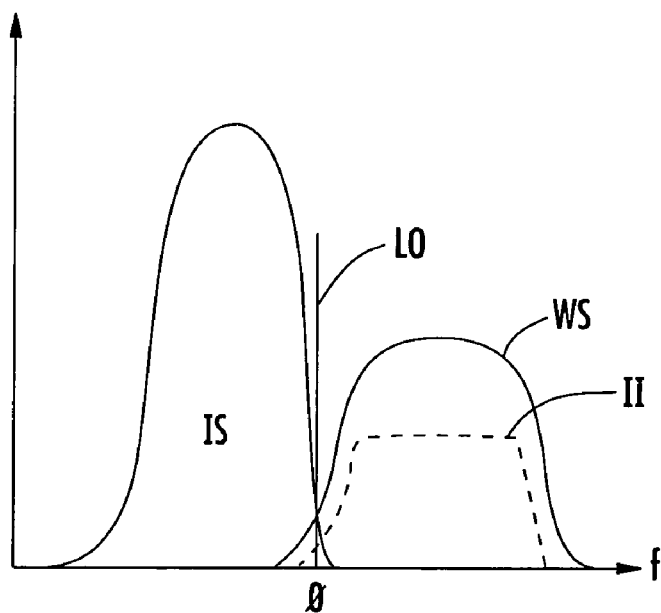
FIG. 6 is a graph similar to that shown in FIG. 5, but after radio frequency (RF) downconversion, and showing the interferer image signal that appears and results from the I/Q imbalance for the amplitude and phase.

FIGS. 5-8 are graphs showing two possible scenarios for the local oscillator signal, also referred to more conveniently as LO, where the local oscillator can appear in the radio frequency RF, as illustrated. FIGS. 5 and 6 show the negative side LO. FIG. 5 shows the LO with a negative frequency offset from the central frequency of the wanted signal (WS). The interferer signal (IS) is shown on the left and the wanted signal on the right. The signal overlap shows the negative side LO. After the RF downconversion as shown in FIG. 6, the interferer image (II) appears because of the I/Q imbalance with the amplitude and phase.

Figure 7:
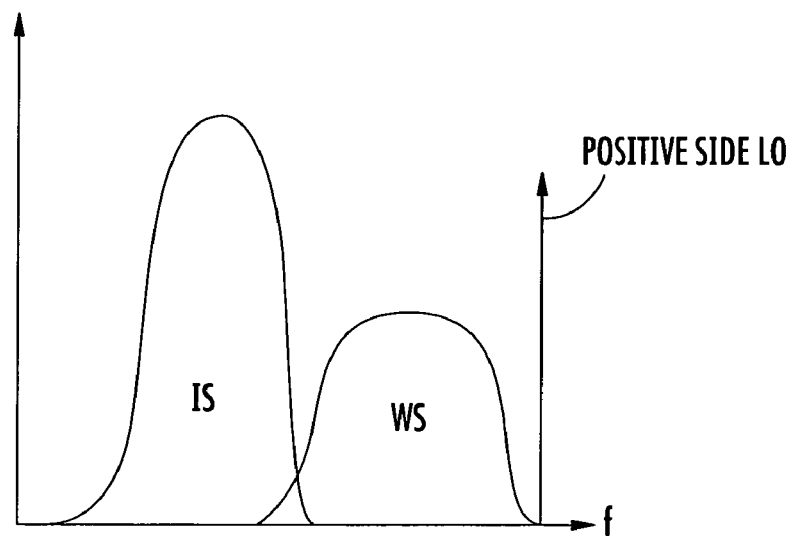
FIG. 7 is a graph similar to FIG. 5, and showing the interferer signal and wanted signals and a positive side local oscillator signal and having a positive frequency offset.
Figure 8:
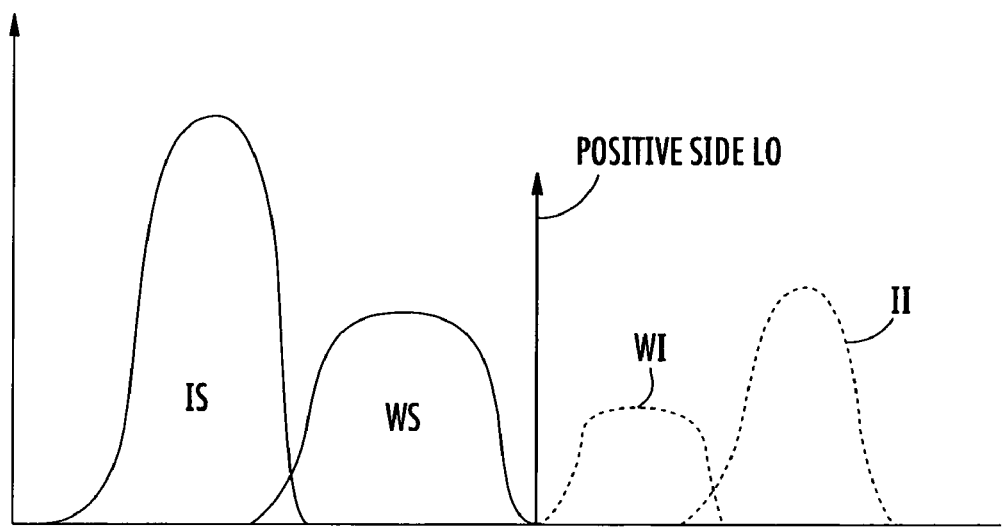
FIG. 8 is a graph similar to FIG. 7, and showing the interferer signal and the wanted signal and the wanted signal image and interferer image.

FIGS. 7 and 8 are graphs showing preferred examples with scenarios of the interferer and wanted signal, and the positive side LO with the positive frequency offset. FIG. 8 shows the interferer signal and wanted signal on the left side, and the wanted image (WI) and interferer image (II) on the right side as illustrated.

It should be understood that FIGS. 5 and 6 illustrate when the LO is between the two signals of the wanted and interferer, and thus, as the negative side LO because it is below the center of the wanted signal. After downconversion as shown in FIG.

6, the LO appears to be zero DC at a basically zero Hz interferer on the negative side. Because of this I/Q imbalance, the image of the interferer significantly reduces and the overlap appears with the wanted signal. The wanted signal appears to be degraded significantly because of the image that overlaps.

FIGS. 7 and 8 show the LO at the positive side such that after downconversion, the interferer on one side is relative to zero and there will be no overlap as the wanted signal. The selectivity filter as described before could remove some unwanted components, leaving wanted signals. Thus, it should be understood that in these examples, FIGS. 5 and 6 represent a case with bad performance, and FIGS. 7 and 8 represent a case with good performance. The system attempts to reach the better position of the local oscillator and tries to maintain the interferer signal on the same side on the wanted signal.

There follows next a pseudocode description using C programming for the system and method. It should be understood that the local oscillator in very low-IF receivers produces a single tone as an unmodulated carrier for the RF mixer input at a wanted GSM channel RF frequency, plus/minus very-low-IF, such that the system and method can dynamically choose the sign of the very-low-IF to obtain the best signal-to-noise ratio (SNR).

Three threads are described, each thread corresponding to a task of processing in the computer program. System initialization is a first thread that occurs one time, followed by a radio control thread and receiver demodulator thread, which are repeated continuously in a loop.

PSEUDOCODE DESCRIPTION

System Initialization:
1. Allocate array CURRENT_LO_COUNTER for all available GSM channels. Set all entries to "0". This array defines how many times we will use currently winning LO side (with best SNR) until it will reach "0".
2. Allocate array LO_SIDE for all available GSM channels. Set all entries to "0" ("0" means low side LO with negative Very_Low_IF; "1" means high side LO with positive Very_Low_IF). This array will define currently used sign of Very_Low_IF.
3. Allocate array TOP_LO_COUNTER for all available GSM channels. Set all entries to "1". This array defines maximum numbers of tries system may apply best LO settings to particular channel without switching back to "worst" LO side to look for changes in the channel conditions.
4. Allocate array WINNING_LO_SNR for all available GSM channels. Set all entries to "0". This array contains SNRs of the winning LO side for each GSM channel.

Radio Control Thread:
1. If RF driver have to configure RF chipset to receive a regular GSM/GPRS burst then:
   1.1. If CURRENT_LO_COUNTER for current GSM channel equal to "0" then program RF chipset to use logical inversion of current LO_SIDE (inverse Very_Low_IF sign).
   1.2. If CURRENT_LO_COUNTER for current GSM channel is larger then "0" then program RF chipset to use current LO_SIDE (keep the same Very_Low_IF sign).

Receiver Demodulator Thread:
1. Demodulate received GSM/GPRS burst and get burst SNR.
2. If CURRENT_LO_COUNTER for current channel is equal to "0" (current SNR represents loosing LO side) then:
   2.1. Set CURRENT_LO_COUNTER equal to TOP_LO_COUNTER for the current channel.
   2.2. If current SNR is larger then WINNING_LO_SNR then:
      2.2.1. If TOP_LO_COUNTER is equal to "1" (lowest possible TOP_LO_COUNTER) then:
         2.2.1.1. Inverse current LO_SIDE (we have new winning LO side).
         2.2.1.2. Update current WINNING_LO_SNR with current SNR value.
         2.2.1.3. Set CURRENT_LO_COUNTER to "0".
      2.2.2. If TOP_LO_COUNTER is LARGER then "1" then decrement TOP_LO_COUNTER.
   2.3. If current SNR is smaller then WINNING_LO_SNR then increment TOP_LO_COUNTER (but no higher then defined maximum limit, in my implementation the highest possible TOP_LO_COUNTER=60).
3. If CURRENT_LO_COUNTER for current channel is NOT equal to "0" then:
   3.1. Store current SNR in the WINNING_LO_SNR array entry (corresponding to current channel).
   3.2. Decrement CURRENT_LO_COUNTER for the current channel.

In the pseudocode above, SNR indicates the signal-to-noise ratio. IF indicates the Intermediate Frequency. LO indicates the local oscillator. It should be understood that in very low intermediate frequency receivers, it produces a single tone typically as an unmodulated carrier for the RF mixer input at the wanted GSM channel RF frequency as +/− very-low-IF. The system and method dynamically chooses the sign of the very-low-IF to obtain the best SNR.

It should be understood that an array is a collection of variables of the same type. Individual array elements can be identified by an integer index. In C the index typically begins at zero. There can be single dimensioned arrays or multiple dimensional arrays. It should be understood that a pointer can be used in place of an array. Also, typically dimensions are not fixed immediately. Space can be allocated as required. When passed as an argument to a function, the size of the array is not necessarily known. Although traditionally some array types in C were one-dimensional, and a fixed, static size specified a compile time, there are variable length arrays that can be used. A block of memory of arbitrary size can be allocated at run-time using a standard library and treated as an array. Pointers, of course, can be formed as a reference that records the address or location of an object in memory and can be manipulated using normal assignments or pointer arithmetic.

In the pseudocode identified above, the array of different channels depends on the form, and could support a plurality of different bands with each band having a set of GSM channels. For example, there could be a few hundred channels on each band. Of course, the more bands the device supports, the larger the array would be.

An array could define which side of the LO will be used for each particular channel. Throughout the description, it should be understood that in the pseudocode above, the term "winning" is also referred to as "better performing." The LO can be fixed in two fixed positions, i.e., positive and negative, corresponding to a frequency offset. Thus, one position could give the better performance as the "winning" or "better performing" side. The arrays can contain counters for each channel. A top counter could indicate how many iterations remain on one side. For example, if the system decides that a negative frequency offset gives the better performance, the system will stay at a negative position for an "n" number of GSM bursts. If the LO is at a negative position, this position could change to the positive as a double check to determine if something has changed on the positive side. Statistics will be calculated, and the top counter could define how many times the system will remain on the better performing or "winning" side. If the negative side is better performing and the top counter is ten, then ten bursts would be received sequentially without changing the LO side. More statistics would be obtained and at some point the system is confident that the negative gives the better performance.

In the system, there could be a reason for going to the positive side in this example. For example, the top LO counter could be at 60, and this many bursts would be received based on the LO position. The current counter could be an indicator of how many iterations are left to zero. Thus, the top counter can be the maximum allowed on one side, in this non-limiting example. This can be set to zero or one and will show which side will be used, indicating which side gives the better performance.

The system initialization thread occurs only once when the device or unit is "turned on." The radio control thread and receiver demodulator thread will cycle over and over in sequence with each other, with the radio control thread followed by the receiver demodulator thread when the burst is received.

In the radio control thread, the RF driver configures the RF chip set to receive a burst. There can be a logical inversion as illustrated.

In the system and method as described, some memory access is maintained in this embedded type of device with limited resources. This system and method provides a minimum amount of information that can be kept in the unit, thus solving some memory issues concerning speed and memory. There are always issues concerning RAM trade-offs used for the algorithm.

Concerning the receiver demodulation thread, the hardware can be set to one and the losing or poor performing side would give the worst or poorer performing performance. The system tries to receive bursts on the better performing side of the LO and the system often must go back to the worst or poorer performing side of the LO to double-check and determine if that side had become better performing. This is one reason why when the current LO counter reaches zero, or as soon as it will hit zero, the system switches to the other position and checks what happens. For example, if the environment changes, the other side could be the better performing side. Thus, the current LO counter can be cycled and kept in the loop. When the system reaches "zero," the system can go to the top position to start counting backward again. When the system goes to the worst or poorer performing LO setting, for example, and the radio environment has changed, the system may determine that it is no longer the worst or poorer performing LO setting, but it is better because the SNR at the worst or poorer performing LO position gives a significantly better SNR. At that time, the system can start reducing the LO counter for the "winning" or better performing side. The system may not switch immediately to the new LO side because this is a GSM system with fading conditions and there could be some false results. It is not desirable to switch based on a false result, and thus, the system decreases the top LO counter for the better performing side because it is less and less "winning" or "better performing."

At some point when the top LO counter reaches one, the system is not confident that side is the better performing. After the switch to the other LO position as the LO side, the system decrements until the system reaches "one" and at that point, there is some confidence that the previous better performing side is not winning or better performing any more and a switch must occur.

In the example of the pseudocode described above, the highest position possible was 60. This is only an example based upon a practical observation. For example, if the system peaks at a low value at 5, it will go to the "worst" or poorer performing LO position frequently and there could be a number of bursts received with lower SNR than expected and the performance will be degraded. But in this case, the algorithm will react very fast on the environment changes. It will efficiently "track" interferer signals. On the other hand, if the system peaks at high value (e.g., >100), overall performance in a static environment will be good. The algorithm will react slow if there are rapidly changing interferers. Based on practical observations, the value of "60" gives good performance for ETSI certification tests as well as maintaining system reaction reasonably fast. If there is a rapidly changing environment, the reactants of the algorithm would be high and would take some time to switch from one LO side to another and the algorithm could be slow. The number of counters can help alleviate this problem.

It should be understood that the algorithm for the system and method controls the synthesizer with one branch passing through a hybrid that can shift by 90 degrees and one branch directly to the mixer.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communications device, comprising:
a housing; and
a circuit board carried by the housing and including radio frequency (RF) circuitry and a processor operative with each other, said RF circuitry comprising a low-IF receiver circuit that is operative for maintaining an interferer signal at a same frequency side as a wanted signal relative to a local oscillator frequency setting, creating an interferer image signal, and filtering the image signal at substantially baseband frequency.

2. A mobile wireless communications device according to claim 1, wherein said RF circuitry comprises a Digital Signal Processing (DSP) circuit operative for filtering said interferer image signal.

3. A mobile wireless communications device according to claim 1, wherein said RF circuitry is operative for placing the interferer signal in the substantially baseband frequency where a highest out-of-band signal attenuation is implemented.

4. A mobile wireless communications device according to claim 1, wherein said RF circuitry further comprises a mixer circuit and a local oscillator circuit operative with the mixer circuit, and a demodulator circuit for demodulating signals from the mixer circuit and oscillator circuit, wherein said RF circuitry is operative for determining a better performing local oscillator frequency setting and a poorer performing local oscillator frequency setting based on signal-to-noise values obtained during demodulation.

5. A mobile wireless communications device according to claim 4, wherein said RF circuitry is operative for using different low-IF local oscillator frequency settings for an RE channel based on the signal-to-noise values.

6. A mobile wireless communications device according to claim 4, wherein communications signals comprise data bursts in accordance with the Global System for Mobile communications.

7. A mobile wireless communications device according to claim 4, wherein said RF circuitry is operative for returning to the poorer performing local oscillator frequency setting from the better performing local oscillator frequency setting after a predetermined number of received data bursts to determine if the local oscillator frequency setting should be changed to adapt to a changed radio environment.

8. A method for enhancing low-IF receiver performance and rejecting an interferer signal, which comprises:
 maintaining an interferer signal at a same frequency side as a wanted signal relative to a local oscillator frequency setting;
 creating an interferer image signal; and
 filtering the image signal at substantially baseband frequency.

9. A method according to claim 8, which further comprises filtering the interferer image signal within a Digital Signal Processing (DSP) circuit.

10. A method according to claim 8, which further comprises placing the interferer signal in the substantially baseband frequency where a highest out-of-band signal attenuation is implemented.

11. A method according to claim 8, which further comprises:
 downconverting signals from a received communications signal;
 demodulating the downconverted signals; and
 determining between a better performing local oscillator frequency setting and a poorer performing local oscillator frequency setting based on signal-to-noise values obtained during demodulation.

12. A method according to claim 11, which further comprises using different low-IF local oscillator frequency settings for an RF channel based on the signal-to-noise values.

13. A method according to claim 11, wherein said communications signals comprise data bursts in accordance with the Global System for Mobile communications.

14. A method according to claim 11, which further comprises returning to the poorer performing local oscillator frequency setting from the better performing local oscillator frequency setting after a predetermined number of received data bursts to determine if the local oscillator frequency setting should be changed to adapt to a changed radio environment.

15. A method according to claim 11, which further comprises downconverting signals within a mixer and local oscillator circuit.

16. A method according to claim 8, which further comprises creating the interferer image signal from a wanted signal band.

17. A low-IF receiver, comprising:
 a local oscillator and mixer circuit for downconverting RF communications signals to low intermediate frequency (IF) signals near baseband;
 an analog-to-digital converter circuit that receives the low IF signals and converts the low IF signals to digital signals; and
 a digital mixer circuit and a processor connected thereto that receives the digital signals and processes them at baseband, wherein said local oscillator and mixer circuit is operative with said digital mixer circuit and processor for maintaining an interferer signal at a same frequency side as a wanted signal relative to a local oscillator frequency setting, creating an interferer image signal and filtering the image signal at substantially baseband frequency.

18. A low-IF receiver according to claim 17, and further comprising a direct digital synthesizer operative with said digital mixer circuit.

19. A low-IF receiver according to claim 17, and further comprising an antenna, a low-noise amplifier (LNA) connected thereto, and a splitter circuit connected to said local oscillator and mixer circuit that receives the RF communications signals and splits said RF communications signals for mixing within said local oscillator and mixer circuit.

20. A low-IF receiver according to claim 17, wherein said processor is operative for producing in-phase (I) and quadrature (Q) output signals.

* * * * *